United States Patent [19]
Anderson et al.

[11] 3,786,341
[45] Jan. 15, 1974

[54] MAGNETIC RESONANCE SPECTROMETER EMPLOYING STOCHASTIC RESONANCE BY A PSEUDORANDOM BINARY SEQUENCE AND TIME-SHARE MODULATION

[75] Inventors: Weston A. Anderson, Palo Alto, Calif.; Richard R. Ernst, Winterthur, Switzerland

[73] Assignee: Varian Associates, Palo Alto, Calif.

[22] Filed: Oct. 26, 1972

[21] Appl. No.: 300,929

[52] U.S. Cl. .............................................. 324/0.5 R
[51] Int. Cl. ............................................ G01n 27/78
[58] Field of Search ...................... 324/0.5 R, 0.5 A, 324/0.5 AC

[56] References Cited
UNITED STATES PATENTS
3,581,191   5/1971   Anderson ......................... 324/0.5 R
3,588,678   6/1971   Ernst ................................. 324/0.5 R
3,711,764   1/1973   Ernst ................................. 324/0.5 R Primary Examiner—Michael J. Lynch
Attorney—Stanley Z. Cole

[57] ABSTRACT

A magnetic resonance spectrometer employing a pseudorandom binary sequence to simultaneously excite magnetic resonance of a plurality of resonance lines in the spectrum of a sample under analysis, the driving radio frequency field being applied to the sample in a train of pulses in each binary sequence, the timing or phase of the pulses being changed in a stochastic manner in the sequence, the composite noise excited resonance signal being detected in a receiver and sampled in a multitude of time displaced intervals in correlation with the binary sequence and stored in an accumulative manner in the associated channels of a memory of subsequent processing, read-out and display, the receiver being activated during the time intervals between the application of the radio frequency pulses to the sample.

20 Claims, 15 Drawing Figures

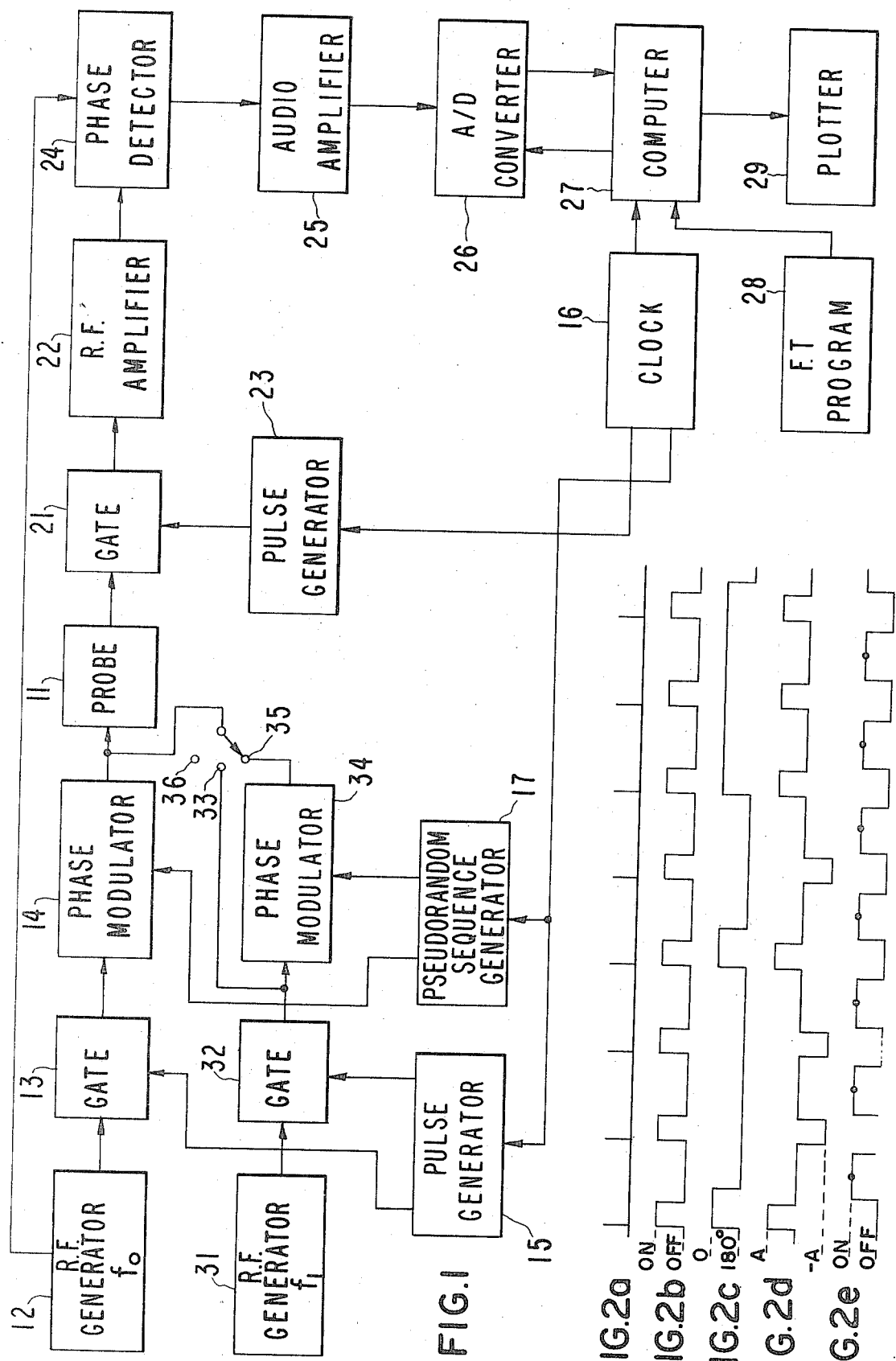

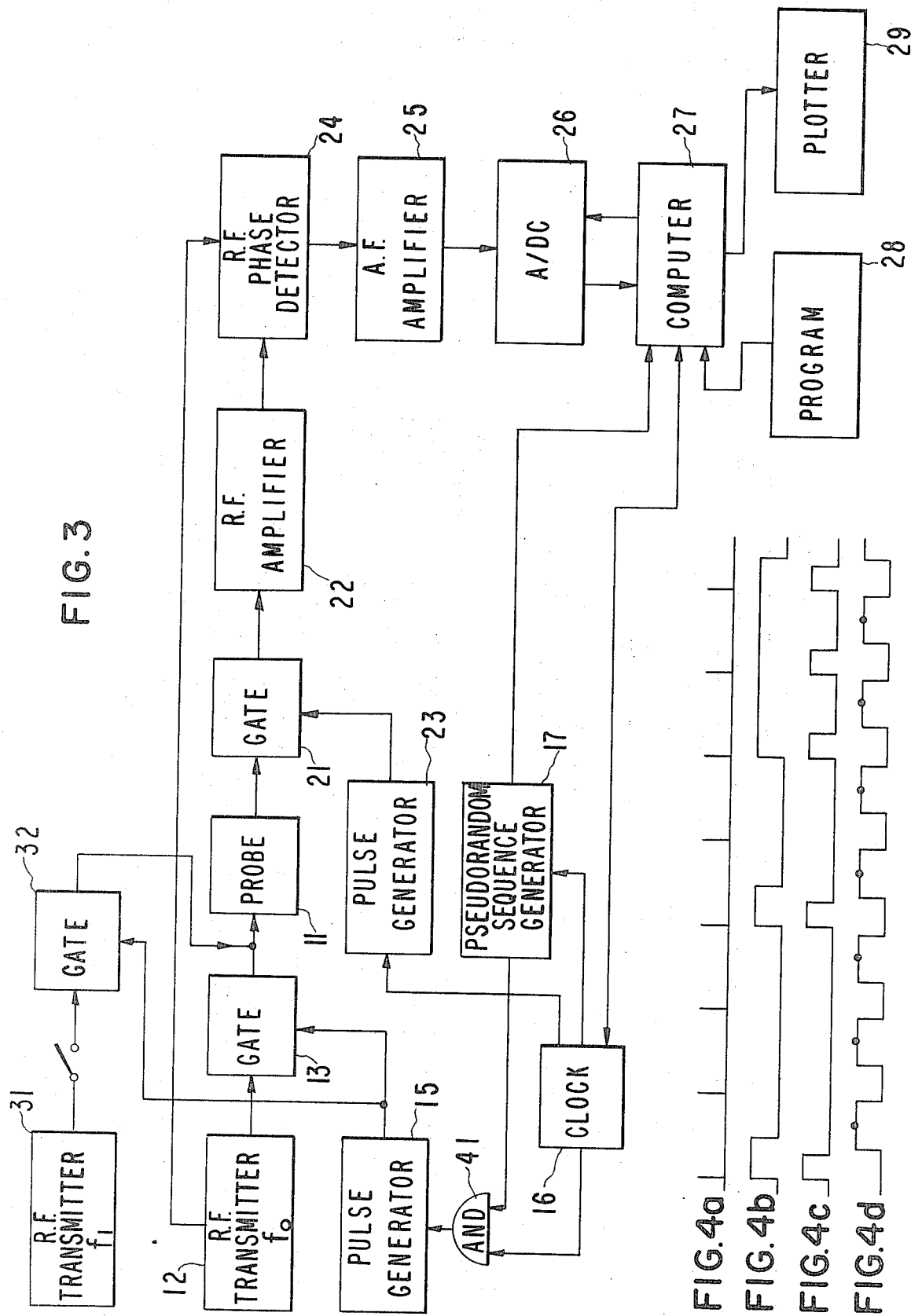

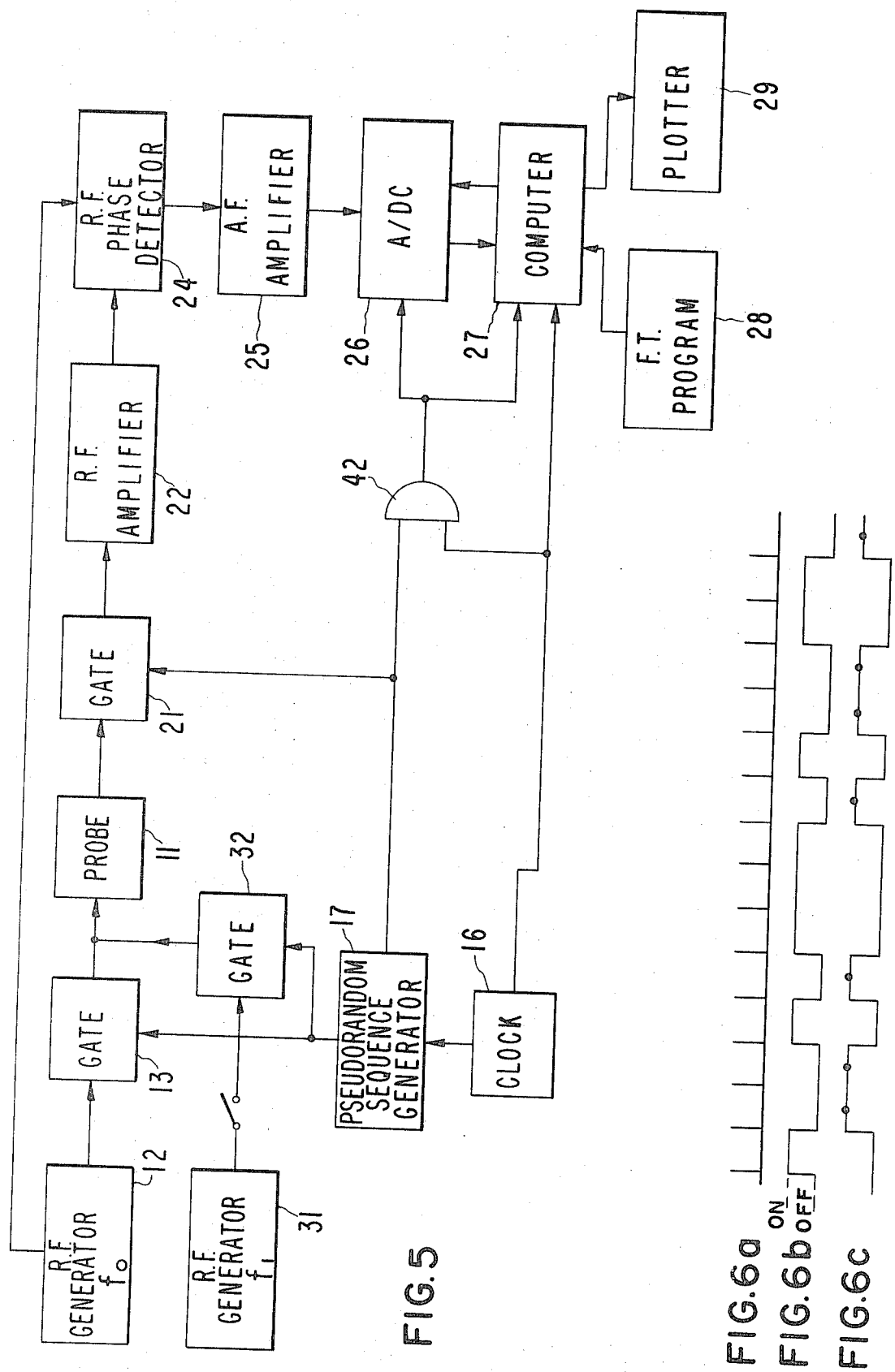

MAGNETIC RESONANCE SPECTROMETER EMPLOYING STOCHASTIC RESONANCE BY A PSEUDORANDOM BINARY SEQUENCE AND TIME-SHARE MODULATION

DESCRIPTION OF THE PRIOR ART

Heretofore, magnetic resonance systems such as nuclear magnetic resonance spectrometers have employed noise excited resonance in the sample under analysis, the radio frequency noise being applied to the sample disposed in a polarizing magnetic field to excite simultaneous resonance of a plurality of separate resonance lines within the sample. The composite noise excited resonance signal output is recorded and then Fourier transformed (analyzed) to derive the separate Fourier frequency components of the resonance spectrum of the sample.

In one form of such a system described in U. S. Pat. No. 3,581,191 issued May 25, 1971 to W. Anderson entitled "Phase Correlation For An RF Spectrometer Employing An RF Carrier Modulated By A Pseudorandom Sequence," noise energy used to excite resonance of the sample is derived by means of a repetitive pseudorandom binary sequence which phase modulates an RF transmitter to derive an RF spectrum of radio frequency noise energy having a spectral density following a $(\sin x/x)^2$ distribution. The resultant noise excited composite resonance signal emanating from the sample is sampled in a multitude of synchronized time displaced intervals during each sequence of the pseudorandom binary sequence used to derive the noise excitation. Each sample interval is stored in a respective channel. During each repetitive cycle of the pseudorandom binary sequence, the resultant resonance signal is sampled at the same successive time displaced intervals and the resonance signal amplitude at each of the time displaced sampling points is added to the respective channel of the memory such that the information for successive binary sequences is accumulated in each of the channels in the memory to obtain a time averaged composite resonance signal. This composite signal is then Fourier transformed to derive the separate Fourier resonance line components of the sample under analysis. Due to the synchronization of the sampling points of the output resonance signal with the pseudorandom binary sequence employed to excite the sample, either the dispersive to absorption mode resonance line components may be derived from the Fourier transformed resonance signals.

In the embodiment shown in FIG. 7 of U.S. Pat. No. 3,581,191, gating means is employed to decouple the noise source trans-mitter from the sample probe immediately after the termination of each complete pseudorandom binary sequence, and sampling of the resonance output in the receiver system is delayed until such transmitter decoupling has been effected. In this way, time sharing is employed so that undesired leakage of the driving radio frequency energy between the transmitter section and the receiver section is substantially eliminated during the read-out period. However, this scheme teaches that a read-out is advantageously available only after the complete binary sequence has taken place. Thus, a sampling is accomplished only during a single segment of time for each complete pseudorandom binary sequence. During this sampling period no signals are stimulated by the driving radio frequency energy and the signal amplitude during this read-out period decays because of the effect of transverse spin relaxation and because of magnetic field inhomogeneities.

SUMMARY OF THE PRESENT INVENTION

In the present invention, the driving radio frequency field is applied to the sample material in the probe in a plurality of repetitive trains of short pulses, and these individual pulses in each train are changed in time or duration or switched in phase stochastically to produce the desired broad band driving radio frequency energy to the sample. The transmitter is decoupled from the probe and the receiver is coupled to the probe in the time intervals between such pulses in each train so that, during the resonance signal detection period, no direct RF leakage occurs between the transmitter section and the receiver section. In this way signals are excited in the sample throughout the time interval of each sequence and detection of resonance takes place intermittently throughout the entire sequence.

By the utilization of the stochastic resonance technique, a large effective radio frequency field strength for a given peak transmitter power is obtained, and, in addition, the resolution and the sensitivity of the spectrometer may be optimized simultaneously by permitting an increase in the length of the pseudorandom sequence while still enabling continuous excitation of the separate resonance lines of the sample simultaneously. By incorporating this novel form of time share modulation with the stochastic resonance technique, the main disadvantage of the stochastic resonance technique, i.e., the direct coupling of the transmitter energy into the receiver section, is avoided while the enhanced resolution and sensitivity obtainable with the stochastic technique is preserved.

BRIEF DESCRIPTION OF THE DRAWINGS

FIG. 1 is a block diagram of a preferred embodiment of the present invention wherein the transmitter pulses are stochastically switched in phase.

FIGS. 2a–2e is a pulse chart showing the stochastic pulse energization of the sample and the time share modulation of the transmitter and receiver sections.

FIG. 3 is a block diagram of a second embodiment of the present invention wherein the transmitter pulses are changed in time in a stochastic manner.

FIGS. 4a–4d is a pulse chart illustrating the operation of the system of FIG. 3.

FIG. 5 is a block diagram of another embodiment of the present invention wherein the transmitter pulses are changed in time duration in a stochastic manner.

FIGS. 6a–6c is a pulse chart illustrating the operation of the system of FIG. 5.

DESCRIPTION OF THE PREFERRED EMBODIMENTS

Referring now to FIG. 1, a magnetic resonance spectrometer, for example a high resolution NMR spectrometer, comprises a probe 11 for positioning the sample to be investigated in the gap of a magnet producing a high intensity unidirectional magnetic field $H_o$. A radio frequency generator 12 produces a driving radio frequency $f_o$ at the magnetic resonance frequency of the sample within the polarizing magnetic field. As is well known in the art, this frequency $f_o$ is uniquely related in value to the magnetic resonance value of the sample in the particular magnetic field $H_o$.

The source 12 of driving radio frequency energy is coupled to the probe 11 via a gate circuit 13 and a phase modulator circuit 14. The gate circuit 13 is controlled from a pulse generator 15 which in turn operates in response to periodic timing pulses (See FIG. 2a) received from a clock circuit 16. The phase modulator 14 is controlled from a pseudorandom sequence generator 17 which in turn is controlled from the clock circuit 16. The output from the gate circuit 13 is a successive series of similar trains of radio frequency pulses, the pulses of each train being of equal time length duration with equal time spacing between each successive pulse (See FIG. 2b). The phase modulator circuit 14 operates in response to the output from the sequence generator 17 (See FIG. 2c) thereby switching the phase of the RF pulses between 0° and 180° in random sequence (See FIG. 2d where the relative phases of the transmitter pulses are signified by A and −A.) This same random sequence is repeated for each successive train of pulses in the series. Other relative phase shifts may be employed such as zero and 90°.

The above described binary phase modulation of the radio frequency carrier signal results in a uniformly distributed power for the radio frequency energy applied to the sample distributed over a relatively wide band width of uniform spectral density, the envelope of the modulated carrier signal having a $(\sin x/x)^2$ function.

This phase modulated transmitter signal applied to the probe 11 simultaneously excites the various resonance lines of the sample under analysis to provide a composite resonance signal output therefrom. This composite output resonance signal from the probe 11 is transmitted via a gate circuit 21 to a radio frequency amplifier 22. The gate circuit 21 is controlled from a pulse generator 23 which in turn is controlled by the clock circuit 16. The pulse generator 23 operates to open the gate 21 between the probe 11 and RF amplifier 22 during the time periods that the gate 13 between the RF generator 12 and the phase modulator 14 is closed and vice versa (See FIG. 2e). Thus, during periods of energization of the probe 11 from the transmitter 12, the receiver circuitry is decoupled therefrom and, during the period the receiver circuitry is coupled to the probe 11, the transmitter is decoupled therefrom.

The composite resonance signal output is amplified in the radio frequency amplifier 22 and then fed to one input of a radio frequency phase detector 24 where it is phase detected against a reference signal derived from the radio frequency generator 12 in well known manner and transformed to the audio frequency range. The audio frequency output signal is amplified by an audio frequency amplifier 25 and fed to the input of an analog to digital converter 26 which performs a time scan on the composite resonance output signal. The time scan is synchronized with each train of transmitter pulses via a control signal derived from the clock 16. The composite resonance signal is sampled at the periodic intervals corresponding to the pulses of the train in each binary sequence. The analog to digital converter 26 converts the sample amplitude of the composite resonance signal into digital data to be sequentially stored in associated channels of the memory of the computer 27, such as a Varian Data Machine 620i computer. The stored information may then be transformed by well known Fourier transform technique via Fourier transform program 28 and the resultant multiresonance line spectrum displayed on a suitable readout device 29, as described in the prior art literature.

Since all of the present day sophisticated NMR spectrometers include a spin decoupling capability, such capability has been incorporated in the embodiment of the invention shown in FIG. 1. As with the main driving radio frequency magnetic field, the spin decoupling field is applied to the sample during the time periods that the receiver circuitry is decoupled from the probe 11. These decoupling fields may be either continuous wave (cw) or they may be broad band, which broad banding could be accomplished by modulating a fixed RF by a pseudorandom sequence.

For decoupling, the spectrometer is provided with a second source 31 of radio frequency magnetic field at $f_1$, this second radio frequency signal being coupled to the probe via a gate circuit 32 controlled from pulse generator 15 so as to be synchronized with gate 13. The train of output pulses from the gate 32 may be applied directly to the probe 11 via switch contacts 33 or these pulses may be first phase modulated in a phase modulator 34 controlled from the pseudorandom sequence generator 17 and thereafter applied to the sample in the probe via the second set of switch contacts 35. The decoupler may be switched off via the switch contacts 36.

As an example of such an NMR spectrometer, the principal frequency $f_o$ may be about 25.145 MHz to observe C–13 resonance within the sample under analysis, and the spin decoupling irradiation may be performed on the H–1 nuclei within the sample with a frequency $f_1$ of about 100 MHz. A typical pseudorandom sequence generator is 4,095 bits long and the clock frequency can be set at 8,190 cps, giving a pseudorandom sequence length of about 0.5 seconds. The transmitter pulses are typically 10–20 $\mu$secs wide and the receiver circuitry is operated at a duty cycle of about 80 percent.

Although the embodiment described illustrates a one point measurement for each of the pulses in the binary sequence, said points being represented by the dots on trace 2e, several measurements can be made for each pulse. These several measurements can be averaged to give an average receiver output reading for each receiver gating period.

Referring now to FIG. 3, a second embodiment of this invention provides a transmitter section utilizing binary intensity modulation wherein the RF pulses are applied stochastically by the omission and presence of pulses in the train in a random sequence. The elements of this system performing the same functions as the system of FIG. 1 bear the same reference numbers and the description of their method of operation will not be repeated. To accomplish the random pulsing, an AND gate 41 is provided with one input coupled to the clock puse source 16 providing the timing pulses (See FIG. 4a) and the other input coupled to the output of the pseudorandom sequence generator 17 (trace of FIG. 4b). Only when the two inputs coincide is there a pulse delivered from the pulse generator 15 to open th gate circuit 13 for transmittal of the desired RF pulse to the sample in the probe 12 (trace 4c). The detection and sampling occurs on a regular periodic basis (trace of FIG. 4d) independent of the random nature of the transmitter pulses. As with the system of FIG. 1, several samplings may take place during each receiver period, although a single sampling is indicated by the dot on trace d. of FIG. 4.

Another embodiment of this invention is shown in FIG. 5 wherein the width of the transmitter pulses is varied in a random manner during each sequence. To provide the same number of samplings during each sequence, the clock pulse rate in this embodiment is doubled relative to the clock rates used in the systems of FIG. 1 and 3. These clock pulses (trace of FIG. 6a) control the pseudorandom sequence generator 17 which operates to open the gate 13 between the RF source 12 and the sample probe 11 for randomly varying periods (trace of FIG. 6b). The receiver gate 21 is opened during those intervals that the transmitter gate 13 is closed. The sampling (see FIG. 6c) is accomplished during the receiver on times, this sampling being synchronized by the AND gate 42 with both the clock pulses from source 16 and the pulses from the pseudorandom sequence generator 17. Although the sampling is not at equal time intervals as in the systems of FIG. 1 and 3, the same number of samplings take place in the same overall sequence time period.

What is claimed is:

1. A magnetic resonance spectrometer comprising transmitter means for producing a spectrum of radio frequency energy to be applied to the sample under analysis, said spectrum covering a plurality of separate magnetic resonance lines in the sample, to thereby produce simultaneous resonance of said lines within the sample, said transmitter means comprising a radio frequency generator for producing a driving radio frequency signal, and means for applying said radio frequency signal to said sample in the form of a plurality of repetitive trains of pulses, the trains of pulses being similar, the pulses in each train being stochastic, receiver means for detecting the simultaneously excited resonance lines of the sample to obtain a composite resonance signal, said receiver means including, means for time scanning and storing a multiplicity of successive time displaced values of the composite resonant signal in a multiplicity of associated memory channels, means for synchronizing the storage of the successive time displaced resonance values in the respective channels with said repetitive trains of pulses, and means for reading out the signal values stored in said memory channels, and means synchronized with said transmitter means for activating said receiver means in the time intervals between said pulses of said train of radio frequency pulses.

2. A spectrometer as claimed in claim 1 wherein said means for applying said RF signal includes means for generating said train of pulses, said train of RF pulses comprising a plurality of pulses, each said pulse being spaced apart equally and the phase of said RF of said pulses being stochastically related to each other.

3. A spectrometer as claimed in claim 2 wherein said phase of said RF takes either of two predetermined values determined stochastically.

4. A spectrometer as claimed in claim 2 wherein said means for applying said pulses of radio frequency signal to said sample comprises a phase modulator for modulating the phase of said radio frequency signal of said radio frequency generator, a pseudorandom sequence generator for controlling said phase modulator to produce a pseudorandom phase switching of said radio frequency signal, a source of clock pulses for controlling said pseudorandom sequence generator, gating means for providing said pseudorandomly phase shifted radio frequency signal to said sample in the form of a plurality of repetitive trains of separate, spaced apart pulses, and a pulse generator means coupled to said source of clock pulses and to said gating means for controlling said gating means.

5. A spectrometer as claimed in claim 4 wherein said means synchronized with said transmitter means comprises a second gating means coupling the receiver means to the sample, and a second pulse generator means coupled to said second gating means and to said source of clock pulses for controlling said second gating means.

6. A spectrometer as claimed in claim 2 including means for providing a second radio frequency signal to said sample at a frequency different from the frequency of said first radio frequency signal and in the form of pulses, and means for synchronizing the application of said pulses of said second radio frequency signal with the pulses of said first radio frequency signal.

7. A spectrometer as claimed in claim 1 including means for providing a second radio frequency signal to said sample at a frequency different from the frequency of said first radio frequency signal and in the form of pulses, and means for synchronizing the application of said pulses of said second radio frequency signal with the pulses of said first radio frequency signal.

8. A magnetic resonance spectrometer as claimed in claim 1 wherein said train of pulses comprises a plurality of pulses of equal width with stochastically varying time spacing between pulses.

9. A spectrometer as claimed in claim 8 wherein said means for applying said pulses of radio frequency signal to said sample comprises gating means coupling the output of said radio frequency generator to said sample, a pulse generator for controlling said gating means to gate said radio frequency signal to said sample, a pseudorandom sequence generator means coupled to said pulse generator for producing stochastic time spacing between pulses, and a source of clock pulses for controlling said pseudorandom sequence generator.

10. A spectrometer as claimed in claim 9 wherein said means synchronized with said transmitter means comprises a second gating means coupling the receiver means to the sample, and a second pulse generator for controlling said second gating means, said second pulse generator being coupled to said source of clock pulses.

11. A spectrometer as claimed in claim 8 including means for providing a second radio frequency signal to said sample at a frequency different from the frequency of said first radio frequency signal and in the form of pulses, and means for synchronizing the application of said pulses of said second radio frequency signal with the pulses of said first radio frequency signal.

12. A spectrometer as claimed in claim 1 wherein said train of pulses comprises a plurality of pulses with stochastically varying widths.

13. A spectrometer as claimed in claim 12 wherein said means for applying said pulses of radio frequency signal to said sample comprises
   gating means coupling the output of said radio frequency generator to said sample,
   a pseudorandom pulse generator coupled to said gating means for controlling operation of said gating means, and
   a source of clock pulses for controlling said pseudorandom pulse generator.

14. A spectrometer as claimed in claim 13 wherein said means synchronized with said transmitter means comprises
   a second gating means coupling the receiver means to the sample, said second gating means being coupled to and responsive to said pseudorandom pulse generator.

15. A spectrometer as claimed in claim 11 including means for providing a second radio frequency signal to said sample at a frequency different from the frequency of said first radio frequency signal and in the form of pulses, and means for synchronizing the application of said pulses of said second radio frequency signal with the pulses of said first radio frequency signal.

16. The method for producing a magnetic resonance spectrum from a sample under analysis comprising the steps of
   producing a spectrum of radio frequency energy to be applied to the sample, said spectrum covering a plurality of separate magnetic resonance lines in the sample, to thereby produce simultaneous resonance of said lines within the sample, said spectrum producing step including
   producing a driving radio frequency signal and applying said radio frequency signal to said sample in the form of a plurality of repetitive trains of pulses, the trains of pulses being similar, the pulses in each train varying stochastically, detecting the simultaneously excited resonance lines of the sample to obtain a composite resonance signal, said detecting step including
   scanning and storing a multiplicity of successive time displaced components of the composite resonant signal in a multiplicity of associated memory channels,
   synchronizing the storage of the successive time displaced resonance components in the respective channels with said repetitive trains of pulses, and
   reading out the signal components stored in said memory channels, said detecting step further including
   synchronizing said applied radio frequency pulses with said resonance detecting to perform said resonance detection in the time periods between pulses of said train of radio frequency pulses.

17. The method as claimed in claim 16 including the steps of
   providing a second radio frequency signal to said sample at a frequency different from the frequency of said first radio frequency signal and in the form of pulses, and synchronizing the application of said pulses of said second radio frequency signal with the pulses of said first radio frequency signal.

18. The method as claimed in claim 15 wherein said train of pulses comprises a plurality of equally spaced pulses with stochastically varying phase.

19. The method as claimed in claim 15 wherein said train of pulses comprises a plurality of pulses of equal width with stochastically varying time spacing between pulses.

20. The method as claimed in claim 15 wherein said train of pulses comprises a plurality of pulses with stochastically varying widths.

* * * * *